(12) United States Patent
Zhao et al.

(10) Patent No.: US 12,360,943 B2
(45) Date of Patent: *Jul. 15, 2025

(54) METHOD AND APPARATUS FOR MEDIA SCENE DESCRIPTION

(71) Applicant: TENCENT AMERICA LLC, Palo Alto, CA (US)

(72) Inventors: Shuai Zhao, Palo Alto, CA (US); Stephan Wenger, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,078

(22) Filed: Aug. 30, 2023

(65) Prior Publication Data

US 2023/0418783 A1  Dec. 28, 2023

Related U.S. Application Data

(63) Continuation of application No. 17/499,380, filed on Oct. 12, 2021, now Pat. No. 11,797,476.

(60) Provisional application No. 63/137,274, filed on Jan. 14, 2021.

(51) Int. Cl.
*G06T 17/00* (2006.01)
*G06F 16/11* (2019.01)
*G06F 8/38* (2018.01)

(52) U.S. Cl.
CPC .......... *G06F 16/116* (2019.01); *G06T 17/00* (2013.01); *G06F 8/38* (2013.01); *G06T 2210/32* (2013.01); *G06T 2210/61* (2013.01)

(58) Field of Classification Search
CPC .......... G06F 17/00; G06F 16/88; G06F 16/84; G06F 16/116; G06F 9/45558; G06F 8/34; G06F 11/3006; G06F 8/38; G06T 2210/61; G06T 2210/32
See application file for complete search history.

(56) References Cited

U.S. PATENT DOCUMENTS

| | | |
|---|---|---|
| 10,636,209 B1 | 4/2020 | Thaller et al. |
| 2009/0066783 A1 | 3/2009 | Lee et al. |
| 2019/0028691 A1 | 1/2019 | Hinds et al. |
| 2019/0265931 A1 | 8/2019 | Kasahara |
| 2020/0066022 A1 | 2/2020 | Leong et al. |

(Continued)

OTHER PUBLICATIONS

International Search Report dated Feb. 2, 2022 from the International Searching Authority in International Application No. PCT/US2021/054746.

(Continued)

*Primary Examiner* — Hau H Nguyen
(74) *Attorney, Agent, or Firm* — Sughrue Mion, PLLC

(57) ABSTRACT

Systems, methods, and devices for managing media storage and delivery, including obtaining, by a media access function (MAF), a Graphics Language Transmission Format (glTF) file corresponding to a scene; obtaining from the glTF file a uniform resource locator (URL) parameter indicating a binary data blob; determining that the binary data blob has a Concise Binary Object Representation (CBOR) format; converting the binary data blob into an object having a JavaScript Object Notation (JSON) format using a CBOR parser function implemented by the MAF; and obtaining media content corresponding to the scene based on the object.

20 Claims, 11 Drawing Sheets

(56) References Cited

U.S. PATENT DOCUMENTS

2020/0120023 A1 4/2020 Munson et al.
2021/0409818 A1 12/2021 Bouazizi et al.

OTHER PUBLICATIONS

Written Opinion dated Feb. 2, 2022 from the International Searching Authority in International Application No. PCT/US2021/054746.
Extended European Search Report issued May 30, 2023 in European Application No. 21918027.0.
Scully et al. "gITF Streaming from 3D Repo to X3DOM." InProceedings of the 21st International Conference on Web3D Technology, Jul. 2016, Retrieved from the Internet <URL:https://discovery.ucl.ac.Uk/id/eprint/1517348/1/Friston_streaming.pdf> (9 pages total).
Fossati, et al. "RFC 8710 Multipart Content-Format for the Constrained Application Protocol (CoAP)." Feb. 2020, <URL: http://www.ring.gr.jp/archives/doc/RFC/rfc8710.pdf> (9 pages total).
Bormann et al. ("RFC 8949 Concise Binary Object Representation (CBOR)", Internet Engineering Task Force (IETF), Published in Nov. 2020, URL: https://www.rfc-editor.org/v3test/rfc8949.pdf (Year: 2020).
"Text of ISO/IEC CD 23090-14 Scene Description for MPEG Media", ISO/IEC JTC 1/SC 29/WG 3, Nov. 30, 2020 (45 pages total).
I Am Axx, "CBOR", Wikipedia, Dec. 7, 2020, (7 pages total), URL: https://en.wikipedia.org/w/index.php?title=CBOR&oldid=992856644.
International Search Report and Written Opinion of the International Searching Authority dated Jan. 25, 2022 in Application No. PCT/US21/53950.
Communication issued Nov. 29, 2024 in European Application No. 21918027.0.
"Buffers, BufferViews Accessors", MeteorChenBo, 2019, pp. 1-3 (3pages total) https://blog.csdn.net/qq_31709249/article/details/86478460.
C. Bormann et al., "RFC 7049: Concise Binary Object Representation (CBOR)", Internet Engineering Task Force (IETF), 2013, ISSN: 2070-1721, pp. 1-54 (54 pages total).
Office Action issued Apr. 14, 2025 in Chinese Patent Application No. 202180020882.6.

FIG. 5

```
{
  "nodes": [         ~ 501
    {
      "name": "nodeName"      ~ 502
    }
  ],
  "scenes": [        ~ 503
    {
      "name": "sceneName",    ~ 504
      "nodes": [ 0 ]          ~ 505
    }
  ],
  "scene": 0         ~ 506
}
```

```
{
  "extensionsRequired":[   — 601
    "MPEG_media"           — 602
  ],
  "extensionsUsed":[       — 603
    "MPEG_media"           — 604
  ]
}
```

FIG. 6

JSON

CBOR

```
82     # array(2)
  61   # text(1)
  61   # "a"           — 721
  BF   # map(*)
  61   # text(1)        — 722
  62 # "b"
  61   # text(1)
  63 # "c"              — 723
  FF   # primitive(*)
```

```
{
  "MPEG_media":
  { "media": [
      "alternatives":
      [  {
           "mimeTypes": "application/cbor",      ─ 801
           "uri": application/cbor;xxxxx",       ─ 802
         }
      ],
    }
  }
}
```

900B

METHOD AND APPARATUS FOR MEDIA SCENE DESCRIPTION

CROSS-REFERENCE TO RELATED APPLICATION

This is a Continuation of U.S. application Ser. No. 17/499,380, filed on Oct. 12, 2021, which claims priority from U.S. Provisional Application No. 63/137,274, filed on Jan. 14, 2021, the disclosures of which is incorporated herein by reference in its entirety.

FIELD

Embodiments of the present disclosure relate to system design to support media objects using a 3D modeling syntax, implement media syntax to support various media codecs, containers, and formats, manage media storage and delivery method through predefined programming interfaces, and provide media buffer control and rendering functions.

BACKGROUND

The Graphics Language Transmission Format (glTF) is an API-neutral runtime asset 3D modeling delivery format. Compared with traditional 3D modeling tools, glTF provides a more efficient, extensible, interoperable format for the transmission and loading of 3D content. glTF2.0 is the most recent version of the glTF specification written by the Khronos 3D Group. This format supports a simple scene graph format that is generally capable of supporting static (untimed) objects in scenes, including "png" and "jpeg" image formats. glTF2.0 supports simple animations, including support for translate, rotate, and scale, of basic shapes described using the glTF primitives, i.e. for geometric objects. glTF2.0 does not support timed media, and hence does not support video nor audio.

"Information technology Coding of audiovisual objects Part 12: ISO base media file format", ISO/IEC 14496-12 (December 2015), "Draft of FDIS of ISO/IEC 23000-19 Common Media Application Format for Segmented Media", ISO/IEC JTC1/SC29/WG11 MPEG117/16819 (April 2017); and "Text of ISO/IEC FDIS 23009-1 4th edition", ISO/IEC JTC 1/SC 29/WG 11 N18609 (August 2019), and the glTF2.0 specification are incorporated herein by reference in their entirety.

SUMMARY

According to an embodiment, a method of managing media storage and delivery is implemented by at least one processor and includes obtaining, by a media access function (MAF), a Graphics Language Transmission Format (glTF) file corresponding to a scene; obtaining from the glTF file a uniform resource locator (URL) parameter indicating a binary data blob; determining that the binary data blob has a Concise Binary Object Representation (CBOR) format; converting the binary data blob into an object having a JavaScript Object Notation (JSON) format using a CBOR parser function implemented by the MAF; and obtaining media content corresponding to the scene based on the object.

According to an embodiment, a device for managing media storage and delivery includes at least one memory configured to store program code; and at least one processor configured to read the program code and operate as instructed by the program code, the program code including: first obtaining code configured to cause the at least one processor to obtain, by a media access function (MAF), a Graphics Language Transmission Format (glTF) file corresponding to a scene; second obtaining code configured to cause the at least one processor to obtain from the glTF file a uniform resource locator (URL) parameter indicating a binary data blob; determining code configured to cause the at least one processor to determine that the binary data blob has a Concise Binary Object Representation (CBOR) format; converting code configured to cause the at least one processor to convert the binary data blob into an object having a JavaScript Object Notation (JSON) format using a CBOR parser function implemented by the MAF; and third obtaining code configured to cause the at least one processor to obtain media content corresponding to the scene based on the object.

According to an embodiment, a non-transitory computer-readable medium stores instructions, including one or more instructions that, when executed by at least one processor of a device for managing media storage and delivery, are configured to cause the at least one processor to: obtain, by a media access function (MAF), a Graphics Language Transmission Format (glTF) file corresponding to a scene; obtain from the glTF file a uniform resource locator (URL) parameter indicating a binary data blob; determine that the binary data blob has a Concise Binary Object Representation (CBOR) format; convert the binary data blob into an object having a JavaScript Object Notation (JSON) format using a CBOR parser function implemented by the MAF; and obtain media content corresponding to the scene based on the object.

BRIEF DESCRIPTION OF THE DRAWINGS

Further features, the nature, and various advantages of the disclosed subject matter will be more apparent from the following detailed description and the accompanying drawings in which:

FIG. 5 is an example of glTF JavaScript Object Notation (JSON) format representation, according to embodiments.

FIG. 6 is an example of MPEG glTF extension, according to embodiments.

FIG. 7A is an illustration of a file having a JSON format, according to embodiments.

FIG. 7B is an illustration of a file having a CBOR format, according to embodiments.

FIG. 8 is an illustration of an example of glTF syntax, according to embodiments.

DETAILED DESCRIPTION

Figure 1:
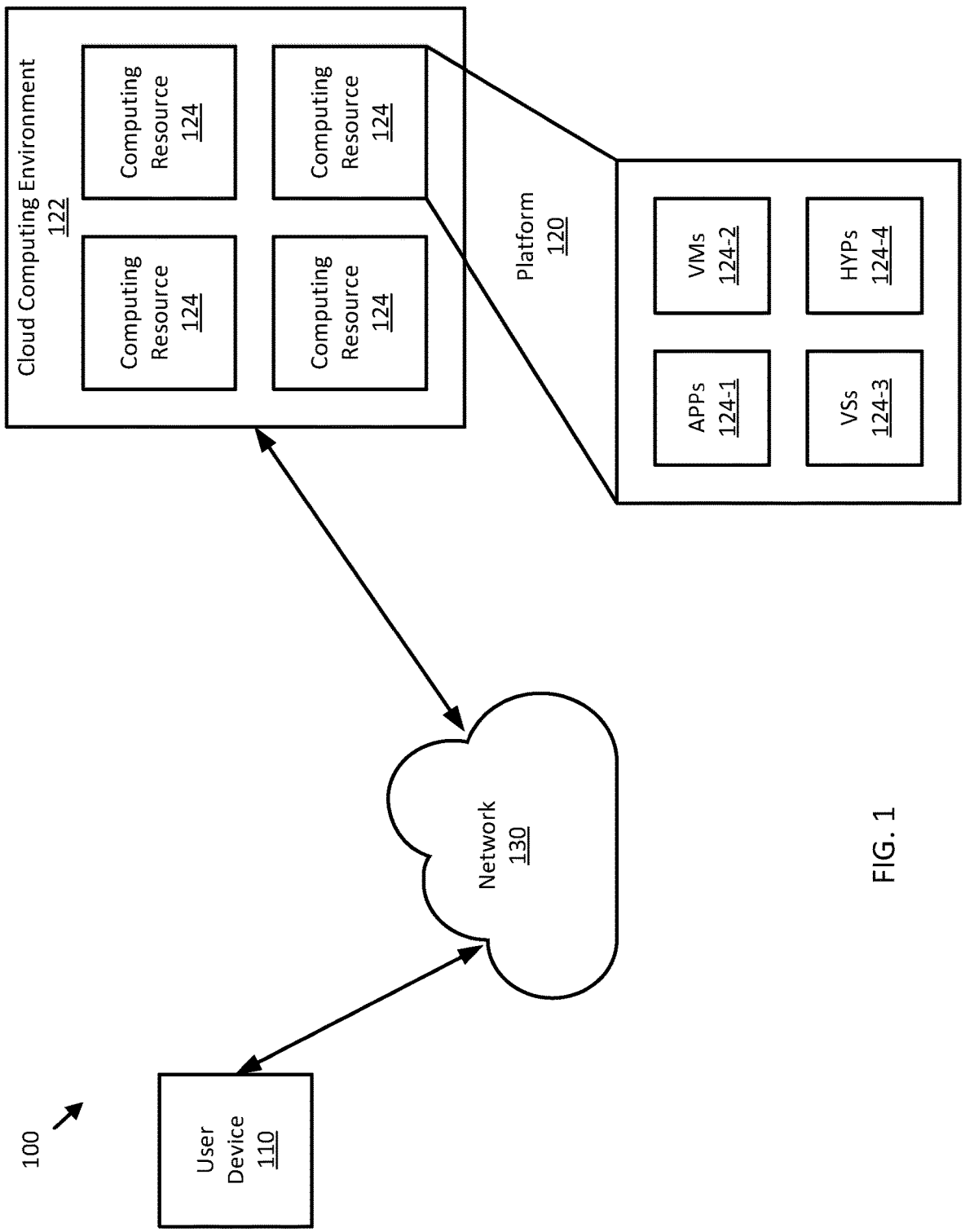
FIG. 1 is a diagram of an environment in which methods, apparatuses and systems described herein may be implemented, according to embodiments.

FIG. 1 is a diagram of an environment 100 in which methods, apparatuses, and systems described herein may be implemented, according to embodiments. As shown in FIG.

1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2. For example, the application 124-1 may provide media streaming that includes, but is not limited to, audio streaming, visual streaming, object description stream, scene description stream, etc. A scene description generally refers to a descriptor that describes a scene. A scene can generally refer to any 2D, 3D, and/or immersive objects and their associated properties, commands, and/or behaviors. The scene description can be transmitted in the form of a scene graph, which is a hierarchical representation of audio, video and graphical objects. Note that scene description can be transmitted independently from other types of streams, e.g., audio stream, visual stream, object description stream, etc.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
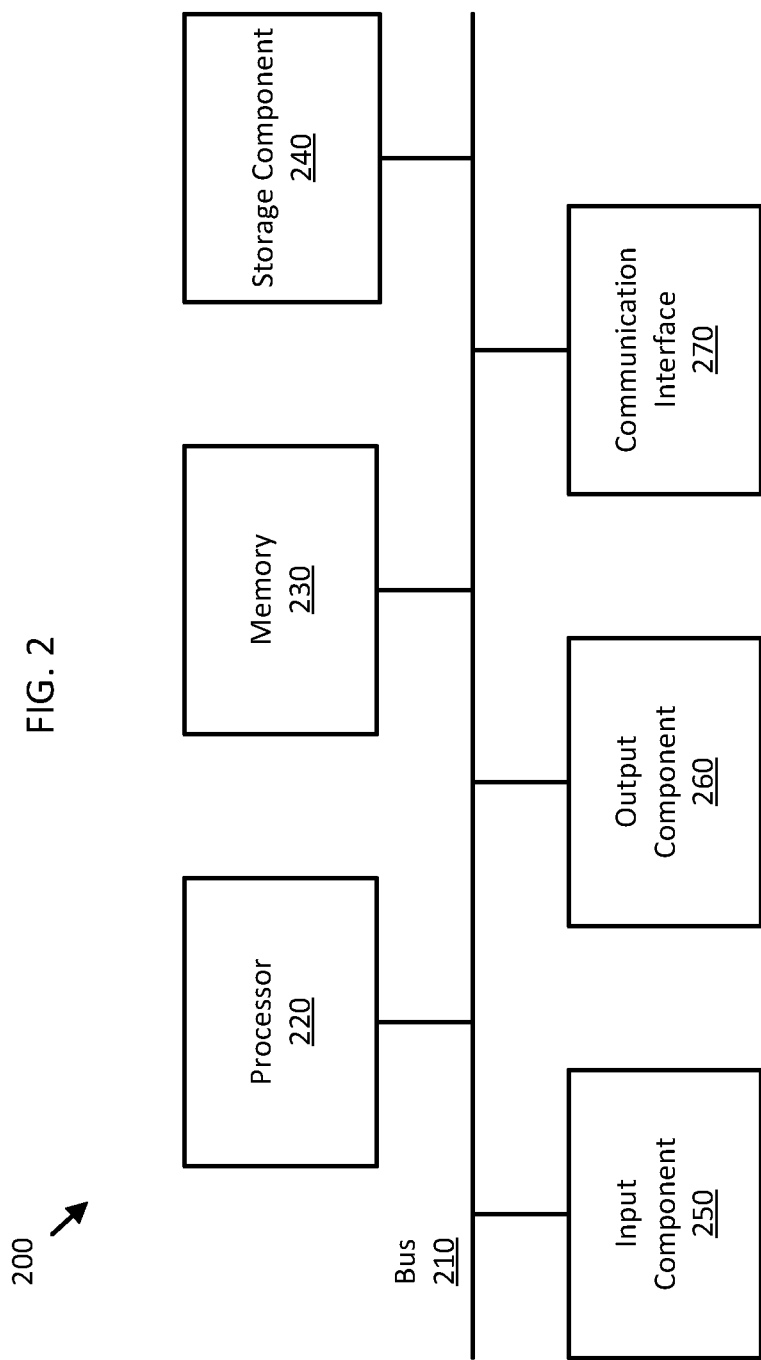
FIG. 2 is a block diagram of example components of one or more devices of FIG. 1, according to embodiments.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
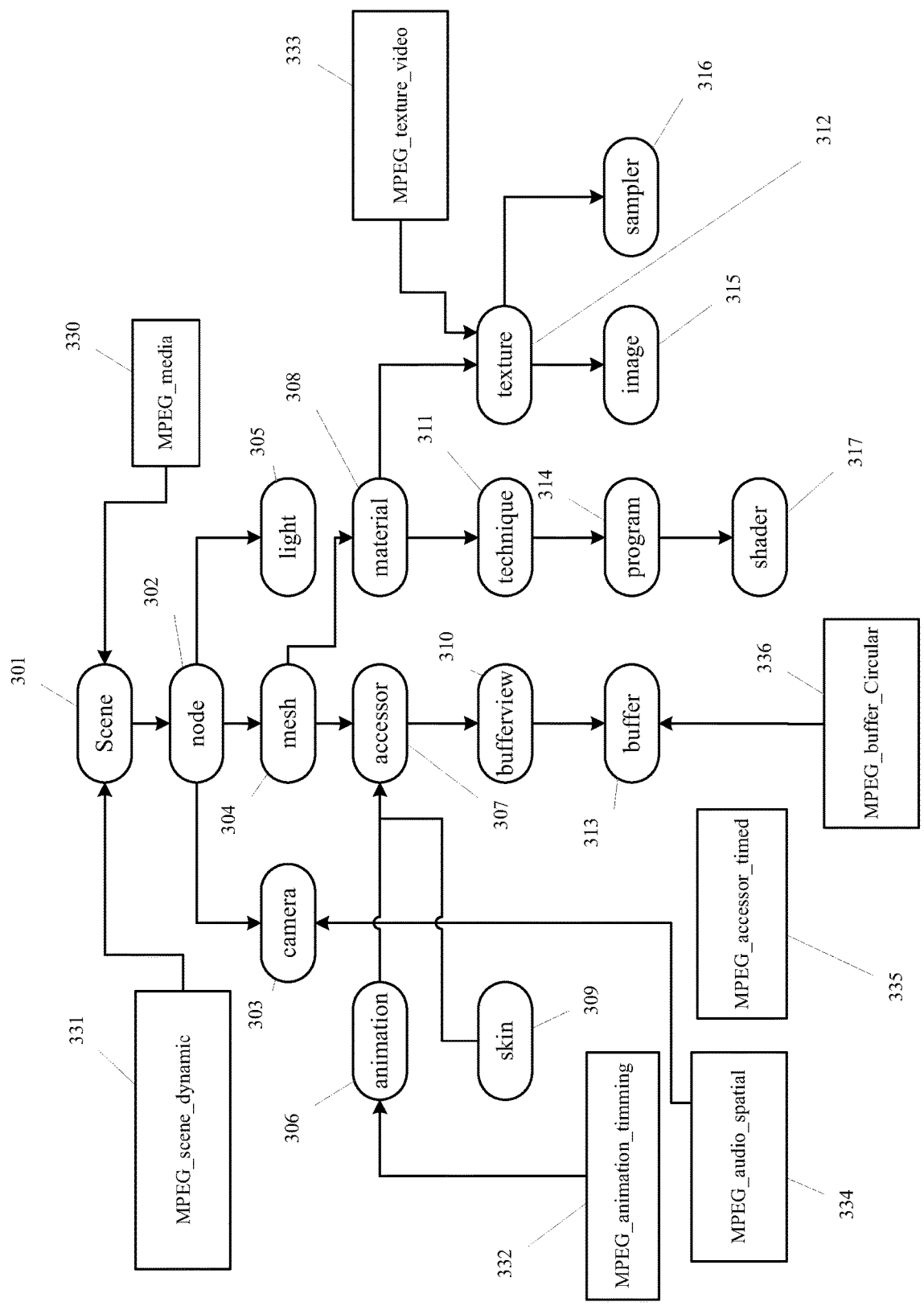
FIG. 3 is a schematic illustration of glTF scene description objects, according to embodiments.

Referring to FIG. 3, the Graphics Language Transmission Format (glTF) is an application programming interface (API)-neutral runtime asset 3D modeling delivery format. Compared with traditional 3D modeling tools, glTF provides a more efficient, extensible, interoperable format for the transmission and loading of 3D content.

A glTF scene may be a combination of multiple glTF assets. The glTF assets may be JavaScript Object Notation (JSON)-formatted files containing a full scene description which may include, for example, a scene object 301, node 302, camera 303, mesh 304, light 305, animation 306, accessor 307, material 308, skin 309, bufferview 310, technique 311, texture 312, buffer 313, program 314, image 315, sampler 316, shader 317, plus supporting external data.

glTF also supports external data sources which may be referenced in any above-mentioned scene objects. In embodiments, a binary file may be used for animation 306 or other buffer-based data 313. An image file may be used for object textures 312.

Referring to FIG. 5, as mentioned above, a glTF scene may be organized in JSON format. A glTF asset may include zero or more scenes 503, which may be the set of visual objects to render. Scenes may be defined in a scene array. In example illustrated in FIG. 5, there is a single scene 506 with a single node 501, although embodiments are not limited thereto. Various parameters that may be associated with each node object. For example, name 502 may specify the name of the node object, and scene name 504 may specify the name of the single scene.

The glTF scene assets may be consumed by a presentation engine for rendering a 3D or immersive scene to users. The existing glTF syntax only supports 3D objects including static or computer-generated animations. There is no support for media types such as video or audio, let alone rendering those video/audio media types.

Meanwhile, existing glTF cannot describe a scene using geographical coordinate systems, which in some media presentation scenarios, such a feature is desired.

Therefore, there is a need to extend the glTF to support media types includes traditional 2D flat video, immersive media content such as virtual reality (VR), augmented reality (AR), extended reality (XR), and spatial audios. This may require an extension to support video/audio syntax and a system for media deliveries and render Moving Picture Experts Group (MPEG) defines some extensions on top of the glTF specification to support immersive media content. Referring to FIG. 3, new extensions are MPEG_media 330, MPEG_scene_dynamic 331, MPEG_texture_video 333, MPEG_animation_timing 332, MPEG_audio_spatial 334, MPEG_accessor_timed 335, MPEG_buffer_circular 336. In FIG. 3 generally, elements with rounded outlines, for example elements 301-317, may be glTF elements, and elements with square outlines, for example elements 330-336, may correspond to MPEG-based extensions of the glTF specification, although embodiments are not limited thereto.

If MPEG_media 330 as a root identifier, if specified, then MPEG_media may be supported. Referring to FIG. 6, the syntax to support MPEG media may be declared as the top-level JSON syntax. Syntax from 601 to 604 in FIG. 6 may be presented exactly as shown if supported.

Scene Updates may be expressed using the JSON Patch protocol and MPEG_scene_dynamic 331 may be used to support JSON patch protocol.

MPEG texture video extension, identified by MPEG_texture_video 333, may provide the possibility to link a glTF texture object to MPEG media and its respective track, listed by an MPEG_media object. MPEG texture video extension may also provide a reference to the MPEG_accessor_timed 335, where the decoded timed texture will be made available.

The MPEG_audio_spatial 334 extension may support multiple audio types.

In order to support timed data access, the buffer element may be extended to provide circular buffer functionality. The extension is named MPEG_buffer_circular 336 and may be included as part of the glTF "buffers" objects, for example buffer 313.

Above MPEG extensions may allow for the creation of immersive experiences using glTF. Eventually the glTF assets with MPEG extension may be used to be load into a rendering engine for visualization.

Figure 4:
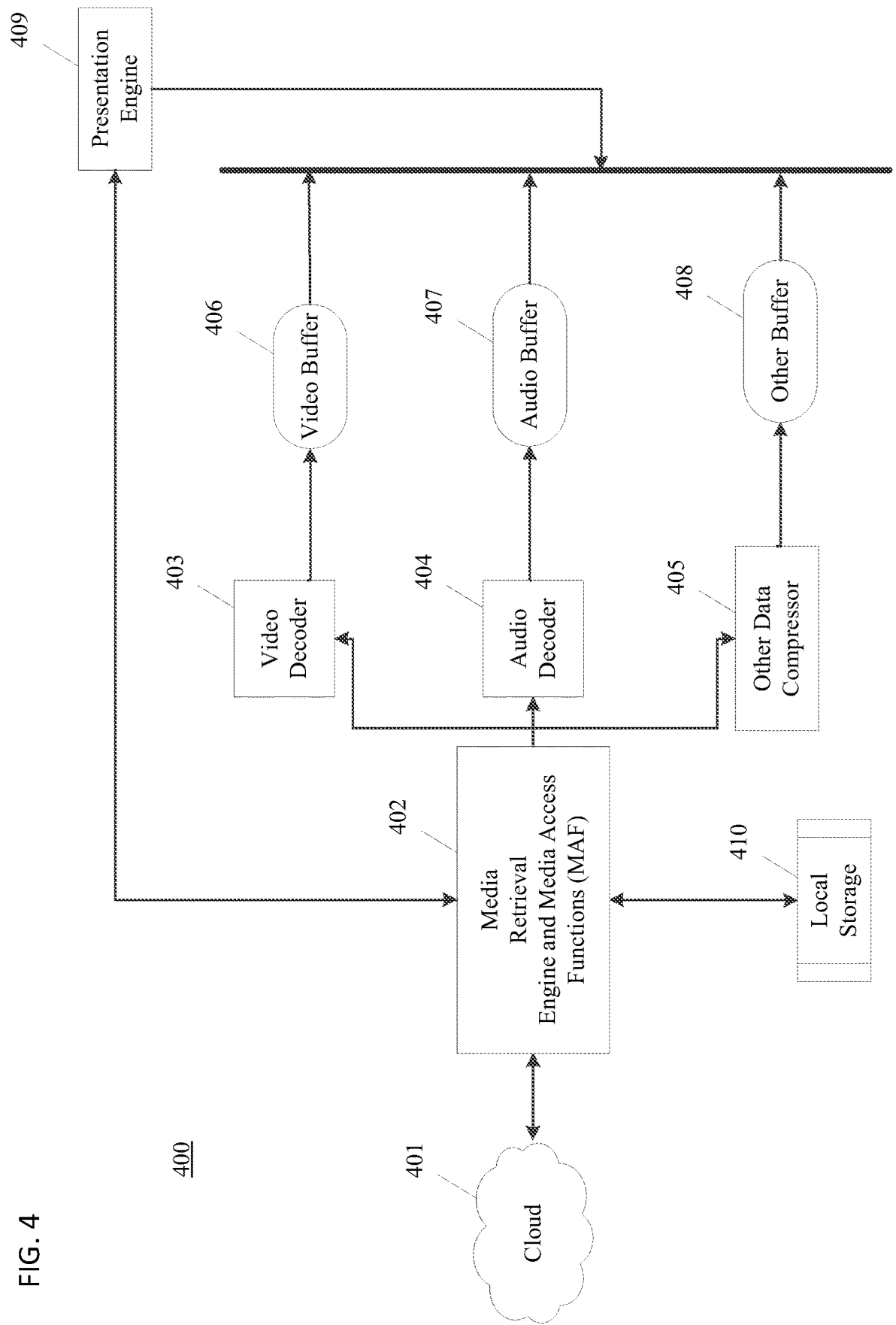
FIG. 4 is a schematic illustration of the media scene description system reference architecture, according to embodiments.

Referring to FIG. 4, a reference media scene description architecture 400 illustrates an example of how MPEG extensions may be used to support media type such as audio/video. The media contents may be retrieved using a Media Retrieval Engine and Media Access Functions (MAF) 402 from external sources such as a media cloud 401, processed using video decoder 403, audio decoder 404, and other data compressor 405, buffered in video buffer 406, audio buffer 407, and other buffer 408, and rendered by a presentation engine 409. In some cases, media content may be stored in local storage 410. MAFs provide a framework for integration of elements from several MPEG standards into a single specification that is suitable for specific but widely usable applications. For example, MAFs can specify how to combine metadata with timed media information for a presentation in a well-defined format that facilitates interchange, management, editing, and presentation of the media. The presentation may be 'local' to the system or may be accessible via a network or other stream delivery mechanism.

Referring to FIG. 4, the MPEG scene description extensions may decouple the Presentation Engine 409 from the Media Retrieval Engine 402. Presentation Engine 409 and Media Retrieval Engine 402 may communicate through the predefined programming interfaces, which allows the Presentation Engine 409 to request media data required for the rendering of the scene. The Media Retrieval Engine 402 may retrieve the requested media and make it available in a timely manner and in a format that can be immediately processed by the Presentation Engine 409. For instance, a requested media asset may be compressed and residing in the network, so the Media Retrieval Engine 402 will retrieve and decode the asset and pass the resulting media data to the Presentation Engine 409 for rendering. The media data may be passed in form of buffers from the Media Retrieval Engine 402 to the Presentation Engine 409. The requests for media data may be passed through a Media Retrieval API from the Presentation Engine 409 to the Media Retrieval Engine 402. For flexible use of video decoding resource, the Video Decoder 403 may be used. When the Video Decoder 403 is used, the Presentation Engine 409 may provide information for input formatting and output formatting to the Video Decoder 403 through Application Configuration APIs.

As discussed above, glTF syntax may be expressed in a JSON file. The Internet Engineering Task Force (IETF) Concise Binary Object Representation (CBOR) may represent a concise data format compared with the traditional JSON format. CBOR relates to similar data objects like JSON in a name/value pair format, but expressed in a binary and compact way, also with much more support with key-value types. A size of a file in CBOR format may be smaller than a corresponding file in JSON format. In some cases, the CBOR file may be more than 50% smaller than the corresponding JSON file. CBOR is registered in Internet Assigned Numbers Authority (IANA) as "application/cbor".

CBOR may be used as one of the glTF interchangeable compressed file formats which also has been widely supported due to its compact data size and interchangeability with JSON.

Information in CBOR is stored in binary form. Because many use cases for information includes machines to understand the data, a binary data format may have speed advantages over human-readable data formats like JSON or XML which may need to be parsed each time the computer or machine is used to understand the data stored.

FIG. 7A illustrates an example of a file in JSON format, and FIG. 7B illustrates an example of a corresponding file in CBOR format. For example, the character "a" (711) in the JSON formatted file of FIG. 7A may correspond to 0x61 (721) in the CBOR formatted file of FIG. 7B. Similarly, the character "b" (712) in the JSON formatted file of FIG. 7A may correspond to 0x62 (722) in the CBOR formatted file of FIG. 7B, and the character "c" (713) in the JSON formatted file of FIG. 7A may correspond to 0x63 (723) in the CBOR formatted file of FIG. 7B.

The usage of CBOR compared with JSON for scene description may bring advantages in terms of small data size, support of multiple key-value types instead of just String object in JSON. Function programming interfaces may be used in the presented media scene description reference architecture, more precisely in the media access function module.

Because the support of CBOR by glTF is gaining popularity, such support may be added into MPEG scene description in order to, for example, increase glTF file format interoperability, reduce file size for local storage or cache, and reduce glTF file transfer latency with minimum processing power at MAF 402.

A CBOR parser function according to embodiments may be implemented by MAF 402 to translate CBOR input into glTF native supported JSON format and also could be used as a file compressor to save the large glTF file into local storage or cache 410.

The CBOR parser API offers one of the methods such as cbor2Json( ), json2Cbor and save( ), as shown in the Table 1 below:

TABLE 1

| Method | Brief Description |
|---|---|
| cbor2Json (FILE) | Convert a CBOR format into a JSON format |
| json2Cbor (FILE) | Convert a JSON format into a CBOR format |
| cbor2Json (Object) | Convert a CBOR data blob into a JSON format |

A detailed interface description may be as follows:

```
interface InputFileParser {
    readonly attribute FILE inputFileName;
    readonly attribute FILE outputFileName;
    readonly attribute CBOR cborDataBlob;
    FILE cbor2Json () (FILE cbor Input) ;
    FILE json2Cbor (FILE jsonInput) ;
    FILE cbor2Json (CBOR cborDataBlob) ;
    bool save () ;
};
```

The above proposed functions may be used for example in various scenarios as follows.

Referring to FIG. 8, a glTF "url" or "uri" syntax may point to a CBOR binary data blob (802). In embodiments, there may be two ways to specify if binary is indeed a CBOR data format. According to Example 1, a Multipurpose Internet Mail Extension (MIME) type may be signaled which specifies a "mimeTypes" with "application/cbor" (801).

According to Example 2, a prefix "application/cbor;" may be included in front of actual binary data. Examples 1 and 2 may be used together. In any case, a function called "cbor2Json(Object)" which takes a CBOR binary data may be called to parse the CBOR file format into a JSON.

If an input glTF is in CBOR format, the output may be a glTF by using cbor2Json( ) API If an input is in a native glTF format, then no conversion may be necessary.

For local storage or cache purpose, a glTF file may be saved as a CBOR by using json2Cbor( ) and save( ) interface.

Accordingly, embodiments may relate to methods of providing glTF file format interoperability with CBOR, reducing file size for local storage or cache, increasing, data transfer speed, reducing file transfer latency.

Figure 9A:
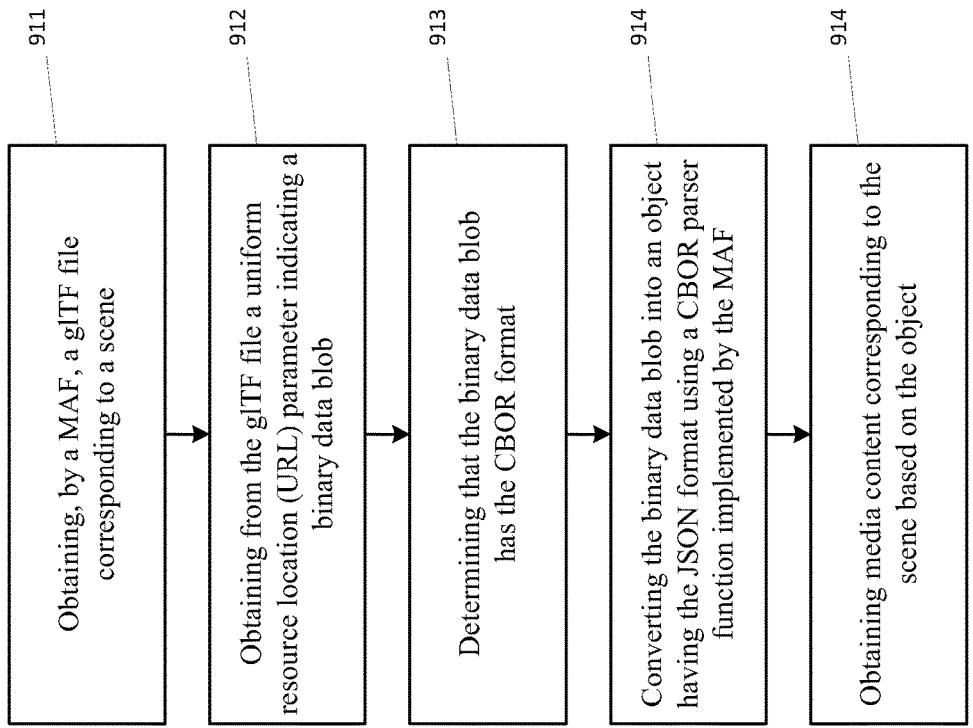
FIGS. 9A-9C are diagrams of example processes for managing media storage and delivery according to embodiments.
Figure 9B:
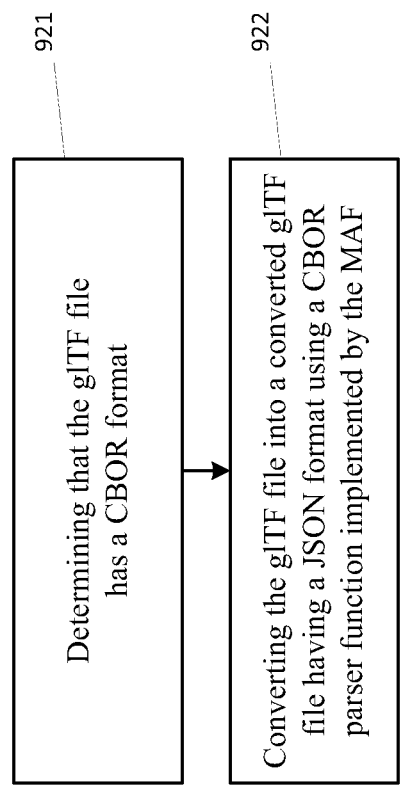
Figure 9C:
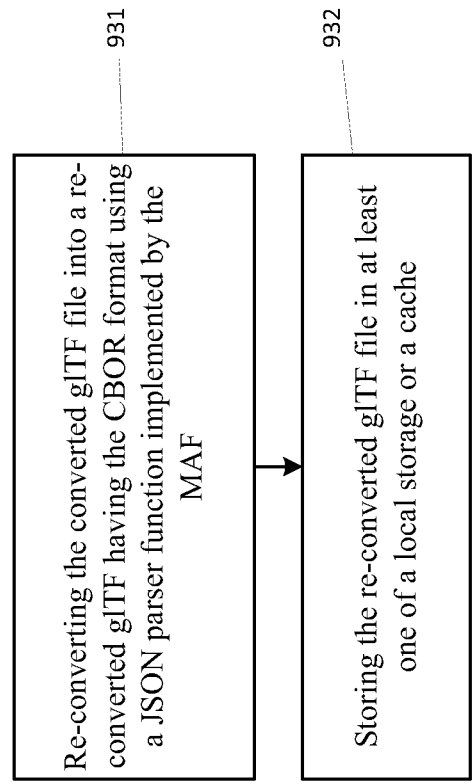

Referring to FIGS. 9A-9C, processes 900A, 900B, and 900C for managing media storage and delivery are described below.

FIG. 9A is a flowchart of an example process 900A for managing media storage and delivery.

As shown in FIG. 9A, process 900A may include obtaining, by a media access function (MAF), a glTF file corresponding to a scene (block 911). In embodiments, the MAF may correspond to MAF 402.

As further shown in FIG. 9A, process 900A may include obtaining from the glTF file a uniform resource locator (URL) parameter indicating a binary data blob (block 912).

As further shown in FIG. 9A, process 900A may include determining that the binary data blob has the CBOR format (block 913).

As further shown in FIG. 9A, process 900A may include converting the binary data blob into an object having the JSON format using a CBOR parser function implemented by the MAF (block 914).

As shown in FIG. 9A, process 900A may include obtaining media content corresponding to the scene based on the object (block 914).

In embodiments, the object having the JSON format may be larger than the binary data blob having the CBOR format.

In embodiments, the binary data blob may be determined to have the CBOR format based on a Multipurpose Internet Mail Extension (MIME) type that is signaled in the glTF file.

In embodiments, the binary data blob may be determined to have the CBOR format based on a prefix included at a beginning of the binary data blob.

In embodiments, the binary data blob may be determined to have the CBOR format based on a Multipurpose Internet Mail Extension (MIME) type that is signaled in the glTF file and a prefix included at a beginning of the binary data blob.

In embodiments, the MAF may be included in a Moving Picture Experts Group (MPEG) scene description architecture.

In embodiments, the CBOR parser function may be implemented using an application programming interface associated with the MAF.

FIG. 9B is a flowchart of an example process 900B for managing media storage and delivery. In embodiments, one or more blocks of process 900B may be performed in combination with one or more blocks of process 900A. For example, one or more blocks of process 900B may be performed after one or more blocks of process 900A.

As further shown in FIG. 9B, process 900B may include determining that the glTF file has a CBOR format (block 921).

As shown in FIG. 9B, process 900B may include converting the glTF file into a converted glTF file having a JSON format using a CBOR parser function implemented by the MAF (block 922). In embodiments, this CBOR parser function may be different from the CBOR parser function used in block 914.

In embodiments, the converted glTF file having the JSON format may be larger than the glTF file having the CBOR format.

FIG. 9C is a flowchart of an example process 900C for managing media storage and delivery. In embodiments, one or more blocks of process 900C may be performed in combination with one or more blocks of processes 900A and/or 900B. For example, one or more blocks of process 900C may be performed after one or more blocks of process 900A, or after one or more blocks of process 900B.

As shown in FIG. 9C, process 900C may include re-converting the converted glTF file into a re-converted glTF having the CBOR format using a JSON parser function implemented by the MAF (block 931).

As further shown in FIG. 9C, process 900C may include storing the re-converted glTF file in at least one of a local storage or a cache (block 932).

Although FIGS. 9A-9C show example blocks of processes 900A, 900B, and 900C, in some implementations, of processes 900A, 900B, and 900C may include additional blocks, fewer blocks, different blocks, or differently arranged blocks than those depicted in FIGS. 9A-9C. Additionally, or alternatively, two or more of the blocks of processes of processes 900A, 900B, and 900C may be performed in parallel. In embodiments, any one or more blocks of processes 900A, 900B, and 900C may be combined with any other one or more blocks of processes 900A, 900B, and 900C in any order, and any one or more of any blocks of processes 900A, 900B, and 900C may be split or combined as desired.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, it should be understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of managing media storage and delivery, the method being implemented by a Concise Binary Object Representation (CBOR) parser application programming interface (API) having at least one processor and comprising:
   obtaining a Graphics Language Transmission Format (glTF) file of a scene description of a scene;
   determining a CBOR format of a binary data blob indicated by the glTF file;
   converting the binary data blob into an object having a JavaScript Object Notation (JSON) format; and
   obtaining media content corresponding to the scene based on the object,
   wherein the binary data blob is determined to have the CBOR format based on a prefix included at a beginning of the binary data blob.

2. The method of claim 1, wherein the object having the JSON format is larger than the binary data blob having the CBOR format.

3. The method of claim 1, wherein the binary data blob is determined to have the CBOR format based on determining both a Multipurpose Internet Mail Extension (MIME) type that is signaled in the glTF file and the prefix included at the beginning of the binary data blob.

4. The method of claim 1, wherein a URL parameter points directly to the binary data blob.

5. The method of claim 1, wherein the binary data blob is determined to have the CBOR format based on determining both a Multipurpose Internet Mail Extension (MIME) type that is signaled in the glTF file and the prefix included at the beginning of the binary data blob, and
   wherein MIME type and the prefix both indicate "application/cbor".

6. The method of claim 1, wherein the MAF is included in a Moving Picture Experts Group (MPEG) scene description architecture.

7. The method of claim 1, wherein the CBOR parser function is implemented using an application programming interface associated with the MAF.

8. A device for managing media storage and delivery, the device comprising:
   at least one memory configured to store program code; and
   at least one processor configured to read the program code and operate a Concise Binary Object Representation (CBOR) parser application programming interface (API) as instructed by the program code, the program code including:
   first obtaining code configured to cause the at least one processor to obtain a Graphics Language Transmission Format (glTF) file of a scene description of a scene;
   determining code configured to cause the at least one processor to determine a CBOR format of a binary data blob indicated by the glTF file;
   converting code configured to cause the at least one processor to convert the binary data blob into an object having a JavaScript Object Notation (JSON) format; and
   second obtaining code configured to cause the at least one processor to obtain media content corresponding to the scene based on the object,
   wherein the binary data blob is determined to have the CBOR format based on a prefix included at a beginning of the binary data blob.

9. The device of claim 8, wherein the object having the JSON format is larger than the binary data blob having the CBOR format.

10. The device of claim 8, wherein the binary data blob is determined to have the CBOR format based on determining both a Multipurpose Internet Mail Extension (MIME) type that is signaled in the glTF file and the prefix included at the beginning of the binary data blob.

11. The device of claim 8, wherein a URL parameter of the glTF file points directly to the binary data blob.

12. The device of claim 8, wherein the binary data blob is determined to have the CBOR format based on determining both a Multipurpose Internet Mail Extension (MIME) type that is signaled in the glTF file and the prefix included at the beginning of the binary data blob, and wherein MIME type and the prefix both indicate "application/cbor".

13. The device of claim 8, wherein the MAF is included in a Moving Picture Experts Group (MPEG) scene description architecture.

14. The device of claim 8, wherein the CBOR parser function is implemented using an application programming interface associated with the MAF.

15. A non-transitory computer-readable medium storing instructions, the instructions comprising: one or more instructions that, when executed by at least one processor of a device for managing media storage and delivery, are configured to cause the at least one processor, as a Concise Binary Object Representation (CBOR) parser application programming interface (API), to:
   obtain a Graphics Language Transmission Format (glTF) file of a scene description of a scene;
   determine a CBOR format of a binary data blob indicated by the glTF;
   convert the binary data blob into an object having a JavaScript Object Notation (JSON) format; and
   obtain media content corresponding to the scene based on the object,
   wherein the binary data blob is determined to have the CBOR format based on a prefix included at a beginning of the binary data blob.

16. The non-transitory computer-readable medium of claim 15, wherein the object having the JSON format is larger than the binary data blob having the CBOR format.

17. The non-transitory computer-readable medium of claim 15, wherein the binary data blob is determined to have the CBOR format based on determining both a Multipurpose Internet Mail Extension (MIME) type that is signaled in the glTF file and the prefix included at the beginning of the binary data blob.

18. The non-transitory computer-readable medium of claim 15, wherein a URL parameter of the glTF file points directly to the binary data blob.

19. The non-transitory computer-readable medium of claim 15, wherein the MAF is included in a Moving Picture Experts Group (MPEG) scene description architecture.

20. The non-transitory computer-readable medium of claim 15, wherein the CBOR parser function is implemented using an application programming interface associated with the MAF.

\* \* \* \* \*